Figure 1:
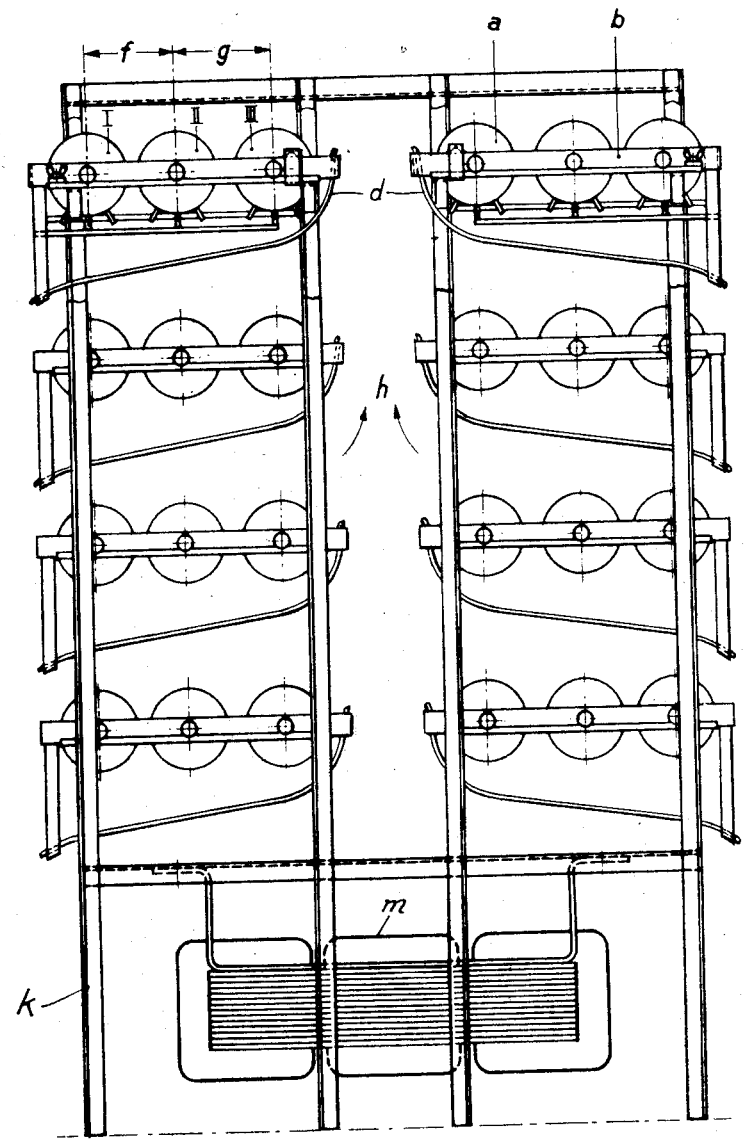

Feb. 13, 1940.  E. KÖRBER ET AL  2,189,909
RECTIFIER SYSTEM
Filed Sept. 1, 1938  2 Sheets-Sheet 1

Inventors:
Emil Körber
Georg Schaller
by E. O. Phinney
Att'y

Patented Feb. 13, 1940

2,189,909

UNITED STATES PATENT OFFICE 2,189,909

RECTIFIER SYSTEM

Emil Körber and Georg Schaller, Nuremberg, Germany, assignors to Suddeutsche Apparatefabrik, Nuremberg, Germany Application September 1, 1938, Serial No. 227,955
In Germany September 2, 1937

11 Claims. (Cl. 175—366)

The present invention relates to rectifier systems, and more specifically to metal dry rectifiers for heavy powers.

The demand for metal dry rectifiers has been more and more extended in the past on account of the specific properties of such type of rectifiers in converting alternating current or triphase current energy into direct current energy. The particular advantages which metal dry rectifiers involve over the other types of rectifiers, such as rotary converters, mercury vapor and glowing cathode rectifiers, include their insensitiveness against extraneous influences, such as vibrations, their long life and, moreover, that they require no attendance.

Metal dry rectifiers adapted for heavy powers, for instance for use in electrogalvanic systems, have been constructed, since the metal dry rectifier is extraordinarily advantageous in such systems on account of the low potentials required for operating such rectifiers. The constructive assembly of the heavy current rectifier devices is the same as has heretofore been applied in connection with the ordinary metal dry rectifiers, in which the rectifier valves are arranged together with the necessary circuit elements, such as transformers and choke coils, fixedly one above the other in housings which are perforated or provided with slots in order to secure ventilation.

The constructive assembly of a metal dry rectifier device, however, is not economical when a given power is exceeded. In cases that a dry rectifier device intended for heavy power operation would be constructed as heretofore mentioned, the device would assume unpermissible dimensions on account of the necessary provision of cooling conditions, while on the other hand artificial cooling by means of ventilators would be inevitably required which, however, would introduce additional costs.

Metal dry rectifiers are as heretofore mentioned very well adapted for application as heavy power rectifiers, for instance, in connection with electrodeposition of metals, and are superior over the heretofore used mercury arc rectifiers. This superiority is particularly accentuated by considering that the individual baths which merely require a potential of a few volts must be connected in series in order to obtain the most suitable operating voltage of a mercury vapor rectifier. However, if metal dry rectifiers are used, the individual electrolytic baths may be separately connected in parallel to the direct current source since these dry rectifiers involve a very high efficiency also at the low voltages which are required in galvanization devices.

The present invention has for its object to provide a constructive assembly of metal dry rectifier devices adapted to operate at heavy powers and which are particularly suitable in connection with electrodeposition of metals. Although the individual groups of rectifier valves are arranged in a relatively compact structure, an automatic cooling and easy exchangeability of the individual groups of rectifier valves are secured. Such heavy power rectifier consists of a number of rack units arranged side by side and connected in parallel with one another. The number of rack units is determined by the power for which the device has been designed.

Figure 2:
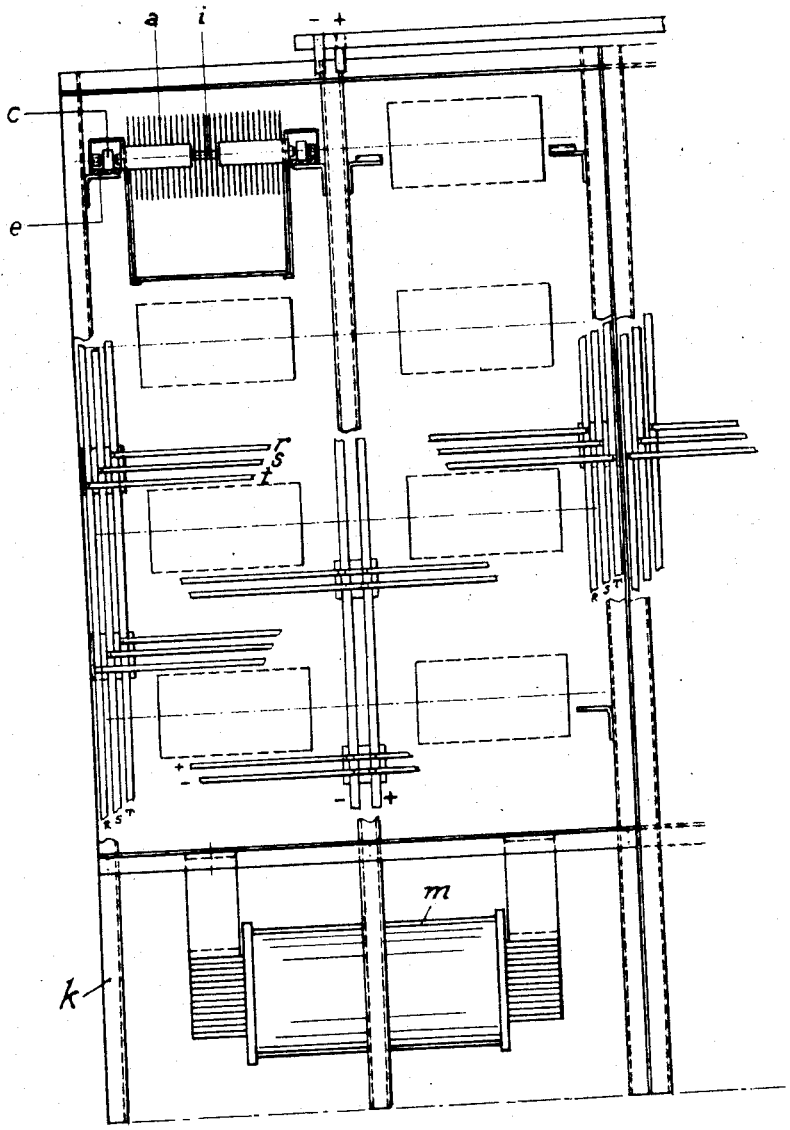

The invention will be more readily understood from the following description taken in conjunction with the accompanying drawings, in which Fig. 1 is a frontal view of a rectifier assembly according to the invention, while Fig. 2 is a side view of the arrangement shown in Fig. 1.

The rack units comprise an iron construction $k$ at the lower portion of which a transformer $m$, switching and fuse elements and, if necessary, one or more choke coils are arranged. The metal dry rectifier elements $a$ are arranged above the aforesaid elements.

The individual dry rectifier valves, as such known in the art, are provided on a threaded bolt $i$ and insulated therefrom. The individual plates of the rectifier valves conductively face one another in their positions on the threaded bolt $i$. In accordance with one feature of the present invention, a number of such dry rectifier elements $a$ is assembled to one unit, and this unit shows three rectifier elements in the embodiment under consideration. These three rectifier elements $a$ are fixedly supported in an iron frame $b$. The ends of the threaded bolt $i$ on which the separate rectifier plates are mounted are extended so as to form an axle for two rollers $c$. The lower end of the frame $b$ is closed by a sheet of metal $d$ which protects the rectifier elements against an ascending air stream which is set up on account of the increased temperature of the lower rectifier elements during operation. The rectifier valve unit may be easily placed in its relative position by the agency of the above mentioned rollers $c$ and the bars $e$ which are attached to the rack. As soon as the frame $b$ has obtained its correct position in the rack, the three pairs of rollers $c$ are brought in engagement with corresponding recesses provided in the bars $e$ so that the frame is fixed in its correct position. The interaxial space $f$ between the rectifier elements I and II, and the interaxial space $g$ between the rectifier elements II and III are different, and it is because of this difference that the rollers cannot engage the corresponding recesses of the bars before the frame has obtained its correct position in the rack.

The three rectifier elements of one rectifier unit are connected as a three phase full wave or Graetz circuit. The electrical connections for applying the alternating current and deriving the direct current are formed as metal tapes in such manner that they establish reliable electrical connections with the alternating current and the direct current bus bars $r$, $s$, $t$ and $+$, $-$, whereupon this correct position is fixed by the agency of a wing nut or like.

The heretofore described arrangement of the individual groups of rectifier valves enables the possibility of establishing connnections with the bus bars in a most simple manner. Moreover, these elements may easily be removed and replaced by new valves in cases that the first mentioned valves might have been damaged in any manner. Two rows of rectifier units arranged one above the other are provided in one frame unit and these rectifier units may easily be reached from opposite ends of the rack. The central portion of the rack forms a chute $h$ in the middle between the two rows of rectifier valve units.

When the heavy current rectifier device is in an operating state, the temperature of the air between the individual rectifier plates is raised. The sheets of metal $d$ arranged at the bottom of each rectifier unit assembly deflect the air stream of higher temperature from the groups of rectifier elements arranged in a higher level of the device so that the hot air stream reaches the chute $h$ where it ascends. A considerable air stream thus flows so that the air of higher temperature is deflected while cool air is drawn from the exterior. This cool stream of air flows between the protecting sheets of metal $d$ and the individual rectifier valves $a$. Due to the different interaxial spaces $f$ and $g$ between the individual rectifier elements in the appertaining frame the width of the cool air stream becomes more restricted between the rectifier elements I and II than between the elements II and III since the air sweeping between the last mentioned elements is brought to a somewhat higher temperature than the air passing between the elements I and II. It is thus possible to secure a uniform cooling of the rectifier valves. The protecting sheet metal $d$ has for its object to prevent the ascending hot air from the lower groups of rectifiers from affecting the rectifier elements at a higher level of the device in such manner that the hot air coming from a lower rectifier unit is drawn off to the center of the device, that is, to the chute. In order to avoid any kind of temperature increase with respect to rectifier elements in higher levels, the protecting members $d$ may be made of a heat insulating material. It is also possible to provide two sheets of metal so arranged relative to each other that a heat insulating space is provided therebetween.

The ends of the protecting members $d$ directed toward the chute $h$ are so bent that the air of increased temperature sweeping along said members is reliably directed into the chute $h$. In cases that the load of the rectifier valves is so increased that a cooling thereof according to the invention would not suffice for maintaining the valves at an adequate operating temperature, small ventilators may be arranged on a circular extension at the upper end of the ventilation chute $h$. These ventilators then serve for drawing off the hot air so as to provide possibilities for a still increased cooling of the rectifier valves. The arrangement of the rectifier valves and particularly the effect of the protecting and air conveying metal sheets $d$ is of great importance also in cases that additional ventilators are employed.

What is claimed is:

1. A metal dry rectifier system for heavy current operation comprising, a plurality of metal dry rectifier elements assembled to rectifier groups each of which consists of a given number of rectifier elements, a number of frames each of which supports in an easily detachable manner a given number of said rectifier groups, a plurality of air directing members individually attached to each of said rectifier group supporting frames at the lower portion thereof, and a rack device adapted to receive in vertical rows the desired number of said frames, said air directing members having such shape and being so located relative to said rack device that the central portion thereof forms a chute through which air streams resulting from a temperature increase in the interior of said rack device during the operation of said rectifiers are drawn off to the exterior of said rack device whereby the groups of rectifiers located in a higher level of said rack device are substantially protected from air streams of enhanced temperature caused by the lower level groups of rectifiers and whereby fresh air can be drawn in through openings in said rack device and swept around said groups.

2. A metal dry rectifier system for heavy current operation comprising, a plurality of metal dry rectifier elements assembled in rectifier groups each of which consists of a given number of rectifier elements, a threaded spindle common to each rectifier group and supporting the appertaining rectifier elements thereof in side by side relation, a roller at each end of said spindle coaxially related thereto, a frame rigidly supporting a given number of said rectifier groups, an air directing member attached to each of said rectifier groups and frame assembly, and a rack device having a number of rails so as to movably receive in vertical rows a desired number of said roller equipped frames, and alternating current and direct current conducting bus bars arranged in said rack device and insulated therefrom, said air directing members having such shape and being so located relative to said rack device that the central portion thereof forms a chute through which air streams resulting from a temperature increase in the interior of said rack device during the operation of said rectifiers are drawn off to the exterior of said rack device whereby the groups of rectifiers located in a higher level of said rack device are substantially protected from air streams of enhanced temperature from lower level groups of rectifiers and whereby fresh air can be drawn in through openings in said rack device and can sweep around said groups.

3. A metal dry rectifier system as set forth in claim 2, in which said groups of rectifiers are arranged in said frame with different interaxial spaces, and in which said rails are provided with recesses spaced apart from one another in correspondence with the different interaxial spaces between said rectifier elements in said frame so as to prevent the frame rollers from engaging said recesses before said frame has obtained its correct position in said rack device.

4. A metal dry rectifier system as set forth in claim 2, in which said groups of rectifiers are provided with current conducting means adapted to establish electrical contact with said bus bars when in the correct position in said rack device, and means for rigidly connecting said conducting means and said bus bars.

5. A metal dry rectifier system as set forth in claim 1, in which said air directing members individually attached to said rectifier groups are made of a heat insulating material.

6. A metal dry rectifier system as set forth in claim 2, in which said air directing members attached to said rectifier group and frame assembly are made of heat insulating material.

7. A metal dry rectifier system as set forth in claim 1, in which said air directing members consist of two adjacent sheets of metal with an intermediate heat insulating space.

8. A metal dry rectifier system as set forth in claim 2, in which said air directing members attached to said rectifier group and frame assembly consist of two sheets of metal with an intermediate heat insulating space.

9. A metal dry rectifier system as set forth in claim 1, in which said air directing members are so formed and having their ends towards the center of said rack device so bent that the air of enhanced temperature is deflected toward the chute in said rack device.

10. A metal dry rectifier system as set forth in claim 1, in which said groups of rectifiers are provided on opposite sides of said rack device and are so arranged that a chute is obtained in the center of said rack between the front rows and the back rows of said rectifier groups arranged one above the other.

11. A metal dry rectifier system as set forth in claim 1, in which particular ventilators are provided in a tubular extension of said chute in order to increase the velocity of the air stream so as to secure an extended cooling of said rectifier groups in cases of particularly heavy current operation.

EMIL KÖRBER.
GEORG SCHALLER.